L. J. BLACK.
HYDRAULIC SWIVEL.
APPLICATION FILED JULY 24, 1920.
1,372,266. Patented Mar. 22, 1921.
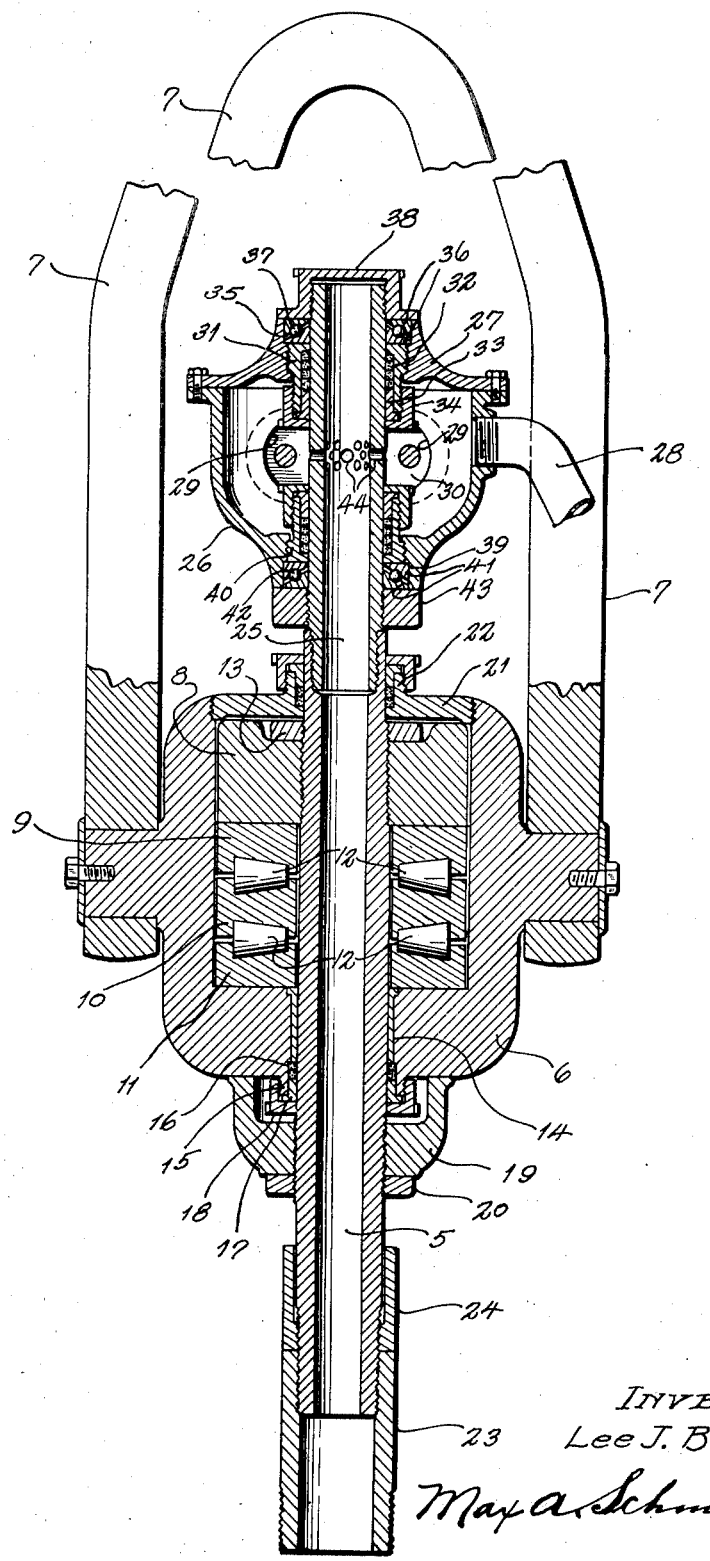
INVENTOR:
Lee J. Black.
Max A. Schmidt
ATTORNEY.

UNITED STATES PATENT OFFICE.

LEE J. BLACK, OF BEAUMONT, TEXAS.

HYDRAULIC SWIVEL.

1,372,266.   Specification of Letters Patent.   Patented Mar. 22, 1921.

Application filed July 24, 1920. Serial No. 398,834.

*To all whom it may concern:*

Be it known that I, LEE J. BLACK, a citizen of the United States, residing at Beaumont, in the county of Jefferson and State of Texas, have invented certain new and useful Improvements in Hydraulic Swivels, of which the following is a specification.

This invention relates to hydraulic swivels used with rotary well drilling machines for making a water-supply connection with the drill stem.

The invention has for its object to provide in a device of the kind stated a novel and improved construction and arrangement of parts to be hereinafter described in detail, whereby the device is rendered more efficient and reliable in operation.

In order that the invention may be better understood, reference is had to the accompanying drawing forming a part of this specification, and in said drawing, a central vertical section of the device is shown.

Referring specifically to the drawing, 5 denotes a swivel stem which passes through and is supported by the swivel cross-head 6, the latter being carried, as usual, by a bail 7 to which the draw cable (not shown) is connected.

In the cross-head 6, and extending down from the top thereof, is a cavity to seat a bearing collar 8 which is fastened to the stem 5, a screw-threaded connection being provided. The cross-head also houses three race-rings 9, 10, and 11 which encircle the stem 5. Conical anti-friction rollers 12 are interposed between the intermediate ring 10, and the top and bottom rings 9 and 11. The bearing collar 8 seats on the top ring 9, and the bottom ring 11 seats on the bottom of the cavity in the cross-head 6. The bearing collar 8 is locked on the stem 5 by a lock nut 13.

The opening in the bottom of the cross-head 6 through which the stem 5 passes is fitted with a brass bushing 14, and this opening is also provided with a stuffing box 15 through which the swivel stem passes, said stuffing box containing a packing 16 and a gland 17 held in place by a screw cap 18. Against the bottom of the cross-head 6 and over the stuffing box 15 and the parts associated therewith, seats a hollow set collar 19 which is screwed on the stem 5 and held in place by a lock nut 20. By means of the set collar all wear of the cone-bearing in the cross-head 6 can be readily taken up.

The top of the cavity in the cross-head 6 is closed by a screw plug 21 provided with a stuffing box 22 through which the stem 5 passes. This stuffing box is also provided with a packing, a gland and a screw cap, the same as the stuffing box 15.

On the lower end of the stem 5 is threaded a sleeve 23 and a set collar 24, the hollow drill stem (not shown) being connected to said sleeve.

To the upper end of the stem 5 is screwed or otherwise separably connected a stem section 25 which extends into a water head consisting of a casing 26 closed at the top by a detachable cap 27, and having a side opening into which is screwed an elbow 28 for connection with the water supply hose (not shown). The casing 26 also has side openings or hand holes 29 provided with cover plates 30, the drawing showing one of these only.

The cap 27 is provided with a stuffing box 31 through which the stem 25 passes, said stuffing box containing a packing 32 and a gland 33 held in place by a screw cap 34. The stuffing box 31 is not integral with the cap 27 but is screwed into a center opening 35 therein so as to project into the casing 26 and open thereinto, the cap 34 being therefore located in the casing. Above the stuffing box 31, the opening 35 contains race-rings 36 between which are located anti-friction balls 37. The rings 36 encircle the stem 25, and to the upper end of the latter is screwed a cap 38 which closes said end of the stem and seats on top of the cap 27 and the upper one of the rings 36.

The bottom of the casing 26 has an opening 39 in which is mounted a stuffing box 40 having a packing, a gland and a screw cap the same as the stuffing box 31. The stuffing box 40 also opens into the casing 26 in the same manner as the stuffing box 31. The opening 39 also contains race-rings 41 between which are located anti-friction balls 42. The rings 41 encircle the stem 25, and to the latter, beneath the casing 26 is secured, by being screwed thereon, a set collar 43, which latter engages the bottom of the casing and the lower one of the rings 41.

It will be evident from the foregoing that the casing 26 is held against longitudinal movement on the stem 25 by the cap 38 and the set collar 43. The stem is however rotatable in the casing, and it turns freely and easily, due to the ball bearings 37 and 42. Leakage of water from the casing is effectually prevented by the stuffing boxes and the parts associated therewith.

The ball bearings 37 and 42 are designed to take care of the vertical strain, and also to take up the lateral strain on the casing 26 due to the water-supply connection at the side. This connection is usually made with a long hose attached to a stand pipe in the derrick, and this has a tendency to cause a side thrust on the casing 26.

The aforesaid action of the ball-bearings 37 and 42 is obtained by having the opposite faces of the race-rings 36 and 41 inclined so that they extend at an oblique angle to the longitudinal axis of the stem 25.

Inside the casing 26, the stem 25 has side apertures 44 through which the water in the casing enters the stem to pass down the same into the main stem 5.

The purpose of the stuffing boxes associated with the cross-head 6 is to form an oil-tight compartment in which the rotating parts run, thereby rendering possible perfect lubrication of said parts, and also excluding therefrom dust, dirt, grit, etc., tending to set up friction and cause undue wear. The oil circulates freely around the stem 5 and the other parts in the cavity of the cross-head.

I claim:

1. In a hydraulic swivel, a swivel stem, a cross-head supporting the swivel stem and from the top of which said stem projects, a water head through which the projecting end of the stem passes and inside of which latter it has side inlets, said water head having an inlet, a collar on the stem and seating against the bottom of the water head, a cap on the upper end of the stem closing the same and seating against the top of the water head, stuffing boxes in the water head at the top and bottom thereon through which the stem passes, said top and bottom of the water head having openings in which the stuffing boxes are mounted, and anti-friction elements in said openings around the stem between the stuffing boxes and the aforesaid collar and cap.

2. In a hydraulic swivel, a swivel stem, a water head through which the stem passes, and inside of which latter it has side inlets, said water head having an inlet, a collar on the stem and seating against the bottom of the water head, a cap on the upper end of the stem closing the same and seating against the top of the water head, stuffing boxes in the water head at the top and bottom thereof through which the stem passes, said top and bottom of the water head having openings in which the stuffing boxes are mounted, and anti-friction elements in said openings around the stem between the stuffing boxes and the aforesaid collar and cap.

3. In a hydraulic swivel, a swivel stem, a water head through which the stem passes, and inside of which latter it has side inlets, said water head having an inlet, a collar on the stem, and seating against the bottom of the water head, a cap on the upper end of the stem closing the same and seating against the top of the water head, stuffing boxes in the water head at the top and bottom thereof through which the stem passes, said top and bottom of the water head having openings in which the stuffing boxes are mounted, and anti-friction elements in said openings around the stem between the stuffing boxes and the aforesaid collar and cap, said elements including means for resisting side thrust of the water head.

In testimony whereof I affix my signature.

LEE J. BLACK.